United States Patent
Pirri et al.

(10) Patent No.: US 10,295,059 B2
(45) Date of Patent: May 21, 2019

(54) CYLINDER MADE OF COMPOSITE MATERIAL FOR AN ACTUATOR AND CORRESPONDING METHOD OF PRODUCTION

(71) Applicants: CIFA S.P.A., Senago (IT); RI-BA COMPOSITES S.R.L. CON UNICO SOCIO, Faenza (IT)

(72) Inventors: Nicola Pirri, Milan (IT); Andrea Bedeschi, Faenza (IT); Paolo Dario Maini, Lissone (IT)

(73) Assignees: CIFA S.P.A., Senago (IT); RI-BA COMPOSITES S.R.L. CON UNICO SOCIO, Faenza (IT)

( * ) Notice: Subject to any disclaimer, the term of this patent is extended or adjusted under 35 U.S.C. 154(b) by 829 days.

(21) Appl. No.: 14/738,209

(22) Filed: Jun. 12, 2015

(65) Prior Publication Data

US 2015/0377353 A1  Dec. 31, 2015

(30) Foreign Application Priority Data

Jun. 13, 2014 (IT) .............................. MI2014A1083

(51) Int. Cl.
*F15B 15/14* (2006.01)
*F16J 10/04* (2006.01)

(52) U.S. Cl.
CPC .......... *F16J 10/04* (2013.01); *F15B 15/1428* (2013.01); *F15B 15/1438* (2013.01); *F15B 2215/305* (2013.01)

(58) Field of Classification Search
CPC .............. F15B 15/1428; F15B 15/1438; F15B 2215/305; F16J 10/04
See application file for complete search history.

(56) References Cited

U.S. PATENT DOCUMENTS 4,685,384 A * 8/1987 Dirkin ................. B29C 63/0021
  92/166
4,867,044 A * 9/1989 Holtrop ................... B29C 70/86
  138/172
(Continued)

FOREIGN PATENT DOCUMENTS

DE  102006047412  6/2007
DE  102012110956 A1 * 5/2014 ............... F16F 9/58
(Continued)

OTHER PUBLICATIONS

JPH06-63596B2 machine translation from espacenet. 1994.*
(Continued)

*Primary Examiner* — Michael Leslie
*Assistant Examiner* — Michael Quandt
(74) *Attorney, Agent, or Firm* — Hamre, Schumann, Mueller & Larson, P.C.

(57) ABSTRACT

Cylinder for an actuator (11), in which said cylinder (10) comprises at least a liner (13) of a tubular shape developing along a longitudinal axis (X), a head portion (14) and a bottom portion (15), each disposed at one of the ends of the liner (13), and longitudinal tie rods (21) connected, externally to the liner (13), both to the head portion (14) and to the bottom portion (15); the longitudinal tie rods (21) are distanced with respect to each other on the circumference of the liner (13), they are made of a composite material formed by reinforcement fibers located in a matrix of binder material and wound between the head portion (14) and the bottom portion (15) according to a predominant orientation substantially parallel to said longitudinal axis (X), and have a continuous annular shape defined by two longitudinal branches (21a) connected by two opposite connection portions (21b, 21c).

9 Claims, 2 Drawing Sheets

(56) References Cited

U.S. PATENT DOCUMENTS

| | | |
|---|---|---|
| 5,198,761 A | 3/1993 | Hashimoto et al. |
| 2016/0201755 A1* | 7/2016 | Hufenbach ............... F16F 9/58 |
| | | 267/74 |

FOREIGN PATENT DOCUMENTS

| | | | |
|---|---|---|---|
| EP | 0239406 | 3/1987 | |
| EP | 0464202 | 1/1992 | |
| FR | 2632025 A1 * | 12/1989 | .......... F15B 15/1438 |
| FR | 2978807 | 2/2013 | |
| GB | 2203215 | 10/1988 | |
| JP | H06-63596 B2 * | 8/1994 | |

OTHER PUBLICATIONS

FR 2632025 A1 machine translation to English from espacenet. 1989.*
Italian Search Report issued in the corresponding Italian Application No. MI20141083, dated Mar. 6, 2015, 2 pages.

* cited by examiner

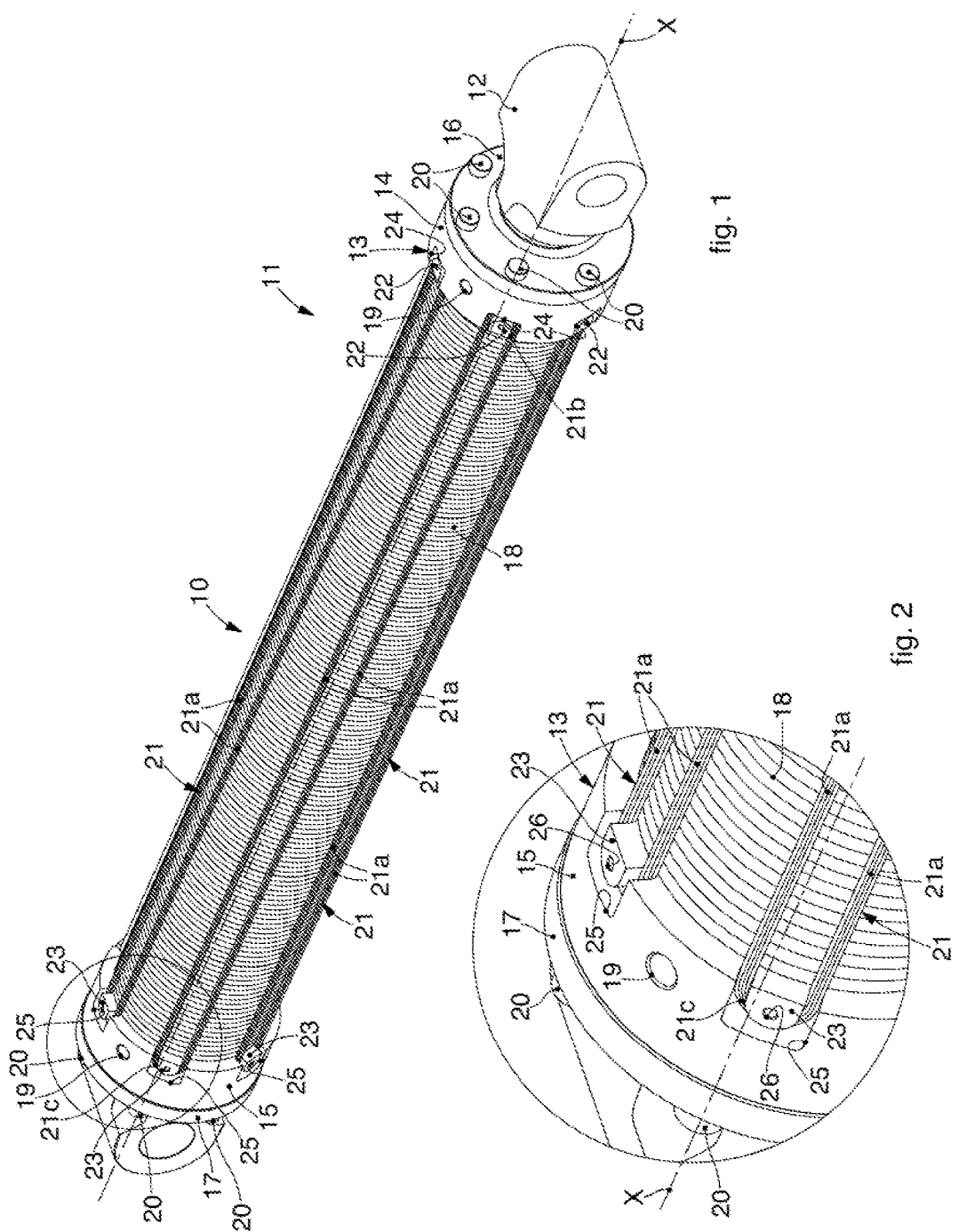

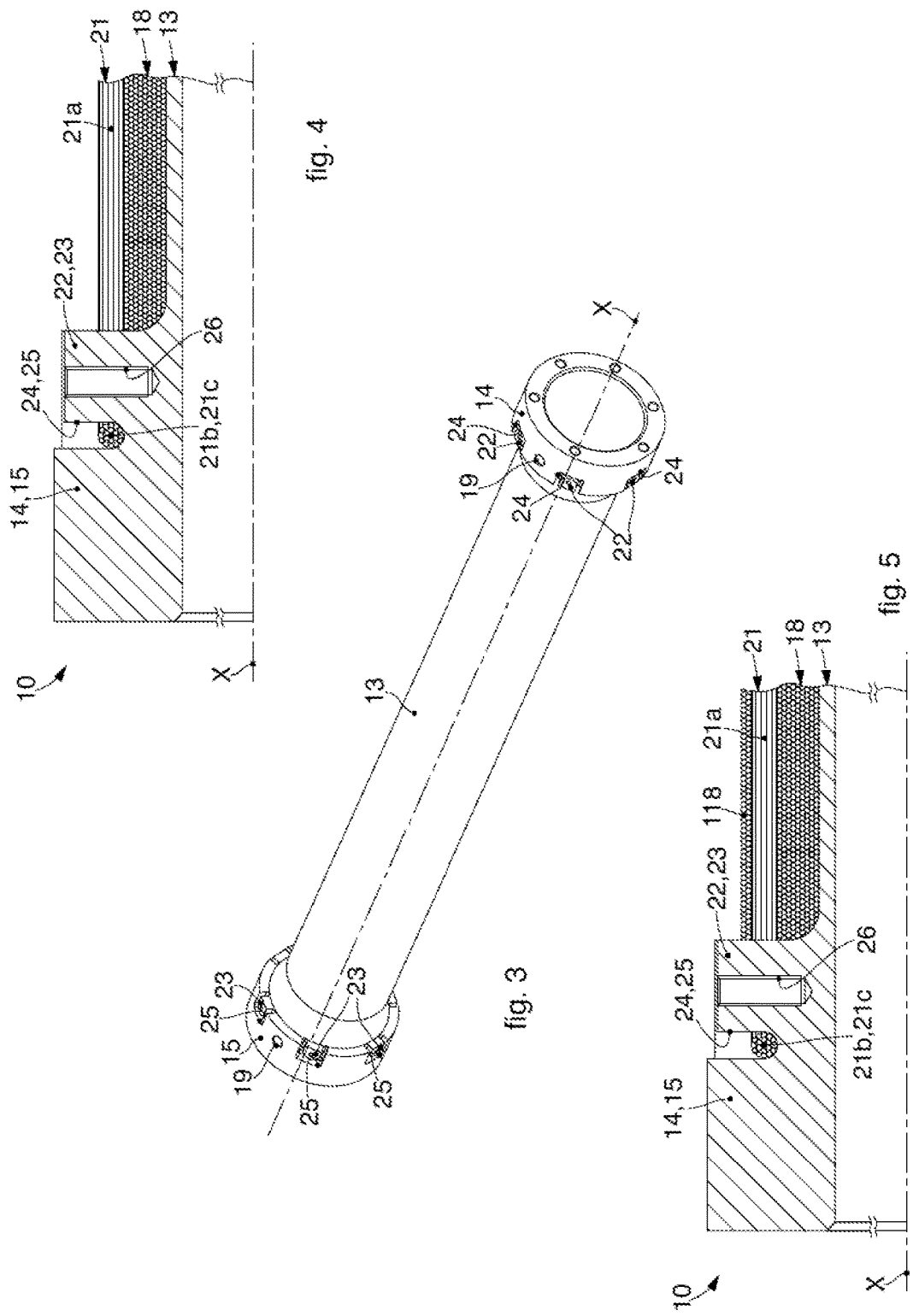

CYLINDER MADE OF COMPOSITE MATERIAL FOR AN ACTUATOR AND CORRESPONDING METHOD OF PRODUCTION

FIELD OF THE INVENTION

The present invention concerns a cylinder made at least partly of composite material and usable as part of a linear actuator, and the corresponding method of production.

The cylinder is preferentially but not restrictively used in actuators of the hydraulic type, and is used in the most varied fields in the art where the combination of mechanical resistance and limited weight is an important design parameter.

The present invention can be used for example in the building trade for moving the arms of cranes or segments of said arms, or in the mechanical engineering field for the application of forces or pressures on products or components of machines, or for actuating movement devices in general.

BACKGROUND OF THE INVENTION

It is known to use linear actuators in the most varied fields in the art, for moving mechanical parts, members of machines, or devices connected to a mobile part of the actuators themselves.

It is also known that linear actuators are used to apply forces or pressures on products, for example on semi-worked products to be deformed or shaped, or parts of machines, for example with the purpose of supporting or lifting weights of said machines.

Linear actuators with a piston are known, comprising a cylinder provided with a cylindrical tubular container, or liner, inside which a gaseous work fluid is contained, for example air, nitrogen or other gas, or liquid, or viscose substance for example oil. A plunger slides inside the liner; connected to a shaft, the plunger defines the piston which receives and transmits the thrust of the work fluid, or compresses and takes in the fluid itself.

Normally the cylinder also comprises a head and a bottom which close the two ends of the liner in a sealed manner.

For the operations that need high pressures and/or that require high forces to be applied, it is known to use oil as the work fluid.

Here and hereafter in the description, and in the claims, for ease of exposition we shall refer to piston type linear actuators by the term "actuators" and the corresponding singular form "actuator", and linear actuators with a piston of the hydraulic type by the simplified expression "hydraulic actuators" and the corresponding singular form "hydraulic actuator".

One of the requirements of actuators, especially in the case of hydraulic actuators, is that they must resist mechanical stresses due to the pressure inside the liner and directed both longitudinally along the longitudinal axis thereof and also radially in a direction perpendicular to said axis.

Known solutions for opposing radial stresses provide to use high-resistance materials studied for the purpose, to thicken the perimeter walls of the liner and/or to coat the perimeter walls with reinforcement materials, for example composites.

Solutions are also known to counter-balance the axial stresses, which provide to use metal tie rods positioned externally to the liner, parallel to the longitudinal axis thereof, and attached to the head and the bottom, normally by screwing.

Another requirement is to contain the mass of the components of the actuators, to obtain advantages in performance, especially in terms of weight/power ratio.

In various applications, for example in pumps for concrete, the reduction in mass and therefore in weight of the components is a sensitive subject in design, because the performance, in terms of weights and sizes, of the whole machine largely depends on the mass of the distribution arm.

It must also be considered that a truck-mounted pump comprises a plurality of segments that clamp the distribution arm, normally from four to seven, with corresponding movement actuators, and that such machines need to have longer and longer arms, in order to reach long distances.

Design efforts have been concentrated on reducing the overall weight of the distribution arm, while keeping the same length. A further requirement has therefore arisen, that is, to also reduce the weight of the actuators associated with the segments, while keeping the same obtainable power.

Normally, in this application, the heavier the distribution arm, the greater the overall sizes of the machine are needed to discharge and absorb the working loads.

In documents EP0464202A1 and U.S. Pat. No. 5,198, 761A a pressurized receptacle is described, made of composite material and comprising a series of elements to be assembled using fibrous material wound in several passes and crossed over around an internal cylinder.

Document GB2203215A describes a double-effect cylinder provided with support tie rods against stresses.

One disadvantage of known actuators, in particular those provided with longitudinal metal tie rods, is that they are heavy and bulky, at least in a radial direction, because of the mass and sizes of the tie rods themselves, which must be suitably sized so as to resist the working stresses. Therefore, this disadvantage is more serious as the working stresses increase, as happens in the case of hydraulic actuators.

Another disadvantage of known actuators is that the metal tie rods not only make the actuators themselves heavier, but are also more subject to damage due to knocks or impacts that can occur during use.

Another disadvantage is that often known cylinders are assembled in several parts, making the final structure even heavier and more complex, given the large number of components and the operations needed to assemble them.

One purpose of the present invention is to obtain a cylinder at least partly made of composite material, usable as part of an actuator and, with the same working mechanical stresses supported, able to allow a reduction in weight of the actuator compared with known actuators.

Another purpose of the present invention is to obtain a cylinder that, with the same working mechanical stresses supported, is able to contain the sizes, at least in a radial direction, of the actuator of which it is part.

Another purpose of the present invention is to obtain a cylinder in which the tie rods are advantageously disposed in a substantially longitudinal direction and distanced from each other, so as to obtain an efficient resistance to axial stresses and to reduce the overall weight of the structure.

Another purpose of the present invention is to obtain a cylinder in which the components and parts to be assembled are reduced to a minimum, or at least limited compared with the parts that make up known cylinders.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a cylinder for an actuator, for example a hydraulic linear actuator, comprises at least a liner of a tubular shape developing along a longitudinal axis, and a head portion and a bottom portion, each disposed at one of the ends of the liner. The cylinder also includes a plurality of longitudinal tie rods connected, externally to the liner, both to the head portion and to the bottom portion.

According to a characteristic feature of the present invention, the longitudinal tie rods are distanced from each other on the circumference of the liner, they are made of a composite material formed by reinforcement fibers located in a matrix of binder material and wound between the head portion and the bottom portion, and have a continuous annular shape defined by two longitudinal branches connected by two opposite connection portions.

In this way the advantage is obtained of making cylinders which, with the same capacity of supporting the axial working stresses, are both lighter and less bulky than the cylinders normally used in the state of the art, because they use longitudinal tie rods made of composite material, distanced from each other and each having a defined, continuous annular shape. The tie rods are also attached directly to the head and bottom portions, by the connection portions.

According to another feature of the present invention, the two longitudinal branches of the tie rods are parallel to each other and to the longitudinal axis of the cylinder.

According to another feature of the present invention, the structure of the cylinder is monolithic, therefore the liner, the head portion and the bottom portion are made in a single piece.

In some forms of embodiment, the reinforcement fibers of the composite material have a predominant orientation substantially parallel to the longitudinal axis.

The orientation of the reinforcement fibers, substantially parallel to the longitudinal axis of the liner, allows to optimize the resistance to said axial stresses.

According to a possible form of embodiment, the head portion comprises first attachment elements, the bottom portion comprises second attachment elements and the reinforcement fibers of each of the longitudinal tie rods are wound alternatively between one of the first attachment elements and one of the second attachment elements, in this way exerting an action of traction between head portion and bottom portion.

Preferably, the first attachment elements are made in a single piece with the head portion, and the second attachment elements are made in a single piece with the bottom portion.

According to one solution of the invention, the first connection portion at least partly surrounds one of the first attachment elements and the second connection portion at least partly surrounds one of the second attachment elements.

Another advantage of the present invention is that it allows to simplify operations to make the cylinders and to optimize the production of the longitudinal tie rods described above.

The present invention also concerns a method to produce a cylinder for an actuator, as described above. The method provides first of all to prepare a liner with a tubular shape developing along a longitudinal axis, a head portion and a bottom portion each disposed at one of the ends of the liner. The method also provides to connect a plurality of longitudinal tie rods both to the head portion and to the bottom portion, externally to the liner, the longitudinal tie rods being distanced from each other and formed by a closed ring structure.

According to the present invention, the method provides to make the longitudinal tie rods of a composite material formed by reinforcement fibers located in a matrix of binder material by winding the reinforcement fibers between the head portion and the bottom portion.

According to some aspects of the present invention, the production of the longitudinal tie rods provides to position the reinforcement fibers with a predominant orientation substantially parallel to the longitudinal axis.

In possible implementations of the present invention, the method provides to connect and position the longitudinal tie rods effecting for each of them, depending on the resistance to be obtained, one or more winding passes of filaments, fibers or strips of the composite material alternately between one of first attachment elements of the head portion and one of second attachment elements of the bottom portion.

In some forms of embodiment, the winding passes provide to make, for each longitudinal tie rod, a first portion at least partly surrounding one of the first attachment elements, a longitudinal branch parallel to the longitudinal axis, a second portion at least partly surrounding one of the second attachment elements, and a second longitudinal branch parallel to the longitudinal axis, to define an essentially annular shape of the longitudinal tie rod.

BRIEF DESCRIPTION OF THE DRAWINGS

These and other characteristics of the present invention will become apparent from the following description of some forms of embodiment, given as a non-restrictive example with reference to the attached drawings wherein:

FIG. 1 is a three-dimensional view of one form of embodiment of an actuator comprising a cylinder according to the present invention;

FIG. 2 is an enlarged detail of FIG. 1;

FIG. 3 is a three-dimensional view of one form of embodiment of a part of the cylinder in FIG. 1;

FIG. 4 is a section view of a detail of FIG. 1;

FIG. 5 is a variant of FIG. 4.

In the following description, the same reference numbers indicate identical parts of a cylinder made of composite material for an actuator according to the present invention, also in different forms of embodiment. It is understood that elements and characteristics of one form of embodiment can be conveniently incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

FIG. 1 is used to describe forms of embodiment of a cylinder 10 used as part of an actuator 11, for example the hydraulic type. Inside the cylinder 10 a piston 12 is inserted slidingly and, in a known manner, receives and transmits inside the cylinder 10 the thrust of a work fluid, for example oil, or compresses or takes in the fluid.

The cylinder 10 includes a liner 13, with a cylinder tubular form and developing along a longitudinal axis X, which also identifies a longitudinal direction in which the piston 12 moves with respect to the cylinder 10.

The cylinder 10 is also provided with a head portion 14 and a bottom portion 15, positioned opposite each other along the longitudinal axis X in correspondence with the two opposite ends of the liner 13.

In possible solutions, the liner 13 can be made of metal material, for example steel, in a single piece or by a plurality of tubular elements connected to each other, for example by welding, screwing or gluing.

According to other forms of embodiment, the liner 13 can also be made of a polymer material, possibly reinforced with fibers, or of a composite material.

FIGS. 1, 2, 4 and 5 describe by way of example forms of embodiment of the cylinder 10 in which the head portion 14 and bottom portion 15 are made in a single piece with the liner 13, of which they make up the two opposite longitudinal ends along the longitudinal axis X.

FIG. 3 can be used to describe possible solutions in which the head 14 and bottom 15 portions are made as physical entities separated by the liner 13 and subsequently connected to it for example by welding, screwing or gluing.

With reference to FIGS. 1 and 2, forms of embodiment of the cylinder 10 provide that it includes a head 16 connected to the head portion 14 of the liner 13, and a bottom 17 connected to the bottom portion 15 of the liner 13.

Possible implementations can provide that the head 16 and bottom 17 are connected by screwing to the respective head portion 14 and bottom portion 15.

The head 16 is configured to seal the head portion 14 of the liner 13 with respect to the outside, preventing the uncontrolled leakage of the work fluid contained therein, and at the same time to allow the piston 12 to slide along the longitudinal axis X.

The bottom 17 is configured to seal the bottom portion 15 of the liner 13 with respect to the outside, preventing the uncontrolled leakage of the work fluid, and at the same time to allow to attach the cylinder 10, and hence the actuator 11, to a machine.

According to some forms of embodiment, it is provided that the liner 13 is coated externally with a circumferential coating 18 made of composite material.

The circumferential coating 18 does not affect the head portion 14 and bottom portion 15, which can therefore be free to house hydraulic connection members 19 to take in and deliver the work fluid, and attachment means 20 to attach the head 16 and the bottom 17.

In possible implementations, the circumferential coating 18 can include one or more layers of composite material formed by reinforcement fibers located in a matrix of binder material.

According to other implementations, the one or more layers of composite material that form the circumferential coating 18 can be deposited on the external surface of the liner 13 using techniques such as deposition and winding of composite materials on a substrate such as for example filament winding, fiber placement or automated tape laying.

The composite material that makes up the circumferential coating 18 can include, as examples of reinforcement fibers, carbon fibers, basalt fibers, or polymer fibers of polymers having a high or very high resistance to traction, such as aramid polymers, very tough and/or high molecular weight polyolefins, polyarylate polyesters, polybenzoxazoles.

The reinforcement fibers confer on the cited composite material a mean resistance to traction at least double that of construction or structural steels, even up to ten times higher.

The circumferential coating 18 of composite material is wound around the liner 13 and is configured to support the stresses that the work fluid exerts from inside on the liner 13 itself in a radial direction, that is, oriented orthogonally with respect to the longitudinal axis X.

In some forms of embodiment, described by way of example with reference to the attached drawings, the circumferential coating 18 has a disposition of the fibers included in the composite material that is adjacent and with a predominant circumferential orientation.

In other forms of embodiment, which can be combined with all the other forms of embodiment described here, the circumferential coating 18 has a reticular structure in which the fibers of the composite material are orientated, around the liner 13, in two or more directions reciprocally incident and inclined with respect to the longitudinal axis X.

The attached drawings are used to describe forms of embodiment in which the cylinder 10 includes longitudinal tie rods 21 disposed parallel to the longitudinal axis X externally with respect to the liner 13 and each connected both to the head portion 14 and the bottom portion 15 of the cylinder 10.

Possible solutions provide that the tie rods 21 are external with respect to the circumferential coating 18 of the liner 13, possibly in direct contact therewith.

The longitudinal tie rods 21 are made of a composite material comprising fibers of a reinforcement material, for example carbon fibers, basalt fibers, or polymer fibers of polymers having a high or very high resistance to traction, such as aramid polymers, very tough and/or high molecular weight polyolefins, polyarylate polyesters, polybenzoxazoles, inserted in a matrix of binder material.

By the terms "high" or "very high" resistance to traction we mean to refer to resistance values equal to or more than 1,000 MPa, even as high as 6,000 MPa or more.

The longitudinal tie rods 21 are made in such a manner that the composite material that makes them up has reinforcement fibers with a predominant orientation substantially parallel to the longitudinal axis X, to support the work loads and axial stresses, that is, oriented in the same way.

Using composite material allows to greatly contain the sizes, and hence the weight, of the longitudinal tie rods 21 compared with the state of the art in which metal tie rods are used, which are generally made of steel and normally have resistance to traction values that on average are less than half, even only a tenth, the average resistance values of fibers of the composite materials described above. Consequently, for the longitudinal tie rods 21 smaller sizes are sufficient to contrast the same stresses.

Furthermore, the composite materials described above have a density on average less than $3.0$ kg/m$^3$, even as little as $1.5$ kg/m$^3$, that is, about a third, even less than a fifth, of the average density of steel, which is around $7.6$-$8.0$ kg/m$^3$.

It can be provided to use the same composite material both for making the circumferential coating 18 and also the longitudinal tie rods 21.

This solution allows to make greater savings in terms of the weight of the cylinder 10, and hence of the actuator 11 in its entirety.

It also allows to reduce the overall sizes of the machine to which the actuator 11 is associated, as can happen for example, in the case of telescopic or articulated arms of cranes, or in the case of truck-mounted pumps for concrete, in which several actuators 11 are normally included.

In the same way as described for the circumferential coating 18, one of the techniques cited above can also be used in order to obtain the longitudinal tie rods 21, that is, filament winding, fiber placement or automated tape laying.

FIGS. 1 and 2 are used to describe forms of embodiment in which both the head portion 14 and the bottom portion 15 of the cylinder 10 include first attachment elements 22 and respectively second attachment elements 23.

The longitudinal tie rods 21 are attached, according to the present invention, to the attachment elements 22 and 23.

According to possible solutions, the attachment elements 22 and 23 can have a cylindrical shape, semi-cylindrical, prismatic, with an axis oriented radially in a transverse or perpendicular manner with respect to the longitudinal axis X and a straight or tapered development along said axis. Other possible shapes can be conical, truncated cone, pyramid, truncated-pyramid or the shape of an irregular solid shaped to perform the function of attaching the longitudinal tie rods 21.

According to possible solutions, the attachment elements 22 and 23 can be made directly in a single body with the head portion 14 and bottom portion 15 of the cylinder 10.

Other forms of embodiment of the present invention provide that the attachment elements 22 and 23 are distinct from the head portion 14 and the bottom portion 15 and are attached to them subsequently. According to this solution, the attachment elements 22 and 23 can be chosen from a group comprising screws, pins, pegs, blocks or suchlike.

The attached drawings are used to describe, merely by way of example, attachment elements 22, 23 contained inside the radial bulk of the respective head 14 and bottom 15 portions; however, other forms of embodiment are possible, in which the attachment elements 22, 23 project radially from the head and bottom portions 14, 15.

In possible implementations, each first attachment element 22 is aligned, in a direction parallel to the longitudinal axis X, with a corresponding second attachment element 23.

In particular, each longitudinal tie rod 21 is attached to a first attachment element 22 of the head portion 14 and to the corresponding second attachment element 23 of the bottom portion 15.

The attachment can be obtained by making each longitudinal tie rod 21 as the winding of one or more filaments, strips or fibers around a pair of attachment elements 22 and 23 aligned with each other.

The longitudinal tie rods 21 can be made by a number of winding passes around the respective pairs of attachment elements 22 and 23, variable according to the axial stresses that each longitudinal tie rod 21 has to support depending on the final use of the actuator 11.

In some forms of embodiment, described by way of example with reference to FIGS. 1 and 2, the longitudinal tie rods 21 can have a continuous annular shape defined by two longitudinal branches 21a, substantially parallel to each other and to the longitudinal axis X, reciprocally connected, possibly in rounded manner, by two opposite connection portions 21b, 21c.

For each longitudinal tie rod 21 there is a first connection portion 21b that at least partly surrounds one of the first attachment elements 22, and a second opposite connection portion 21c that at least partly surrounds the attachment element 23 aligned with the first attachment element 22.

Each pair of aligned attachment elements 22 and 23 performs, for a corresponding longitudinal tie rod 21, the function of axial abutment in a direction parallel to the longitudinal axis X. The abutment allows to keep the composite material in position during the production of each longitudinal tie rod 21 by the winding passes described above, and allows the solid attachment thereof so as to support and discharge the working axial stresses onto the longitudinal branches 21a.

The attached drawings are used to describe, merely by way of example, possible solutions of attachment of the longitudinal tie rods 21 to the head portion 14 and bottom portion 15 of the cylinder 10.

According to these solutions, it is provided that the head portion 14 and the bottom portion 15 have a bigger radial bulk than that of the liner 13 coated with the circumferential coating 18, and that the attachment elements 22, 23 are contained inside said radial bulk.

Implementations are also possible, described by way of example with reference to FIGS. 2, 4 and 5, in which, in correspondence with each attachment element 22 and 23, attachment seatings 24, 25 are provided, made respectively in the head portion 14 and the bottom portion 15, and each configured to contain a connection portion 21b, 21c of a longitudinal tie rod 21.

The attachment seatings 24, 25 can be made at the rear of the attachment elements 22, 23, that is, they can be positioned, with reference to the longitudinal direction, each on the opposite side of an attachment element 22, 23 with respect to the space between a first attachment element 22 and the second attachment element 23 aligned with it.

In possible solutions, described by way of example with reference to FIGS. 4 and 5, the attachment seatings 24, 25 can be made radially in the head portion 14 and the bottom portion 15, and can have a development orthogonal to the longitudinal axis X or inclined with respect thereto, to define an undercut.

In some forms of embodiment, the attachment seatings 24, 25 can be open in a radial direction toward the outside of the cylinder 10, and in a longitudinal direction toward the space comprised between the head portion 14 and the bottom portion 15 of the cylinder 10. By way of example, the attachment seatings 24, 25 can each be substantially C-shaped, which surrounds a respective attachment element 22, 23.

In these implementations, the composite material that makes up the longitudinal tie rods 21 can be inserted radially into the attachment seatings 24 and 25 during the winding process around the attachment elements 22, 23, and can be guided by the conformation of the attachment seatings 24, 25 themselves around the respective attachment elements 22, 23.

In this way an integration of the longitudinal tie rods 21 is advantageously obtained inside the radial bulk of the head portion 14 and bottom portion 15, allowing to contain the sizes of the cylinder 10 in its entirety.

With reference by way of example to FIG. 4, the cylinder 10 can therefore have, externally with respect to the liner 13 but integrated in the radial bulk of the head 14 and bottom 15 portion, the circumferential coating 18 and the longitudinal branches 21a of the longitudinal tie rods 21, in which the diversified predominant disposition of the reinforcement fibers allows the functional separation of resistance to the different stresses.

FIG. 5 is used to describe variant forms of the cylinder 10 in which it also includes an external coating 118, which surrounds the liner 13 and externally overlaps at least the longitudinal branches 21a of the longitudinal tie rods 21.

The external coating 118 is made of a composite material and can have reinforcement fibers with a predominant circumferential orientation. The external coating 118 can have the double function of assisting the circumferential coating 18 in resisting radial stresses and of containing the longitudinal tie rods 21 radially so that they do not detach from the attachment seatings 24, 25.

The external coating 118 also has the function of protecting the longitudinal tie rods 21 from damage from possible knocks or interference that can occur with the devices in movement.

If the external coating 118 has the protection function, it can be made of aramid fibers, carbon fibers, glass fibers, or polymer materials such as for example polyethylene.

It is clear that modifications and/or additions of parts may be made to the cylinder 10 as described heretofore, without departing from the field and scope of the present invention.

For example, with reference by way of example to FIGS. 2, 4 and 5, each of the attachment elements 22, 23 can be provided with a radial hole 26 configured to allow to connect a guide member, not shown in the attached drawings, used to guide the filaments, fibers or strips of composite material during the winding passes that allow to make the longitudinal tie rods 21.

It is also clear that, although the present invention has been described with reference to some specific examples, a person of skill in the art shall certainly be able to achieve many other equivalent forms of cylinder made of composite material for an actuator, having the characteristics as set forth in the claims and hence all coming within the field of protection defined thereby.

The invention claimed is:

1. A cylinder for an actuator, comprising:
   a liner of a tubular shape disposed along a longitudinal axis;
   a head portion and a bottom portion, each disposed at one of the ends of said liner,
      wherein said head portion comprises first attachment elements, and
      said bottom portion comprises second attachment elements; and
   longitudinal tie rods connected, externally to said liner, both to said head portion and to said bottom portion, wherein said longitudinal tie rods are distanced from each other on the circumference of said liner,
      each of said longitudinal tie rods is made of a composite material formed by reinforcement fibers located in a matrix of binder material,
      each of said longitudinal tie rods is wound between the head portion and the bottom portion to have a continuous annular shape defined by two longitudinal branches connected by two opposite connection portions, wherein said two longitudinal branches are parallel to each other and to said longitudinal axis,
   wherein the reinforcement fibers of each of said longitudinal tie rods are wound alternatively between one of said first attachment elements and one of said second attachment elements,
   a first of said connection portions at least partly surrounds one of the first attachment elements,
   a second of said connection portions at least partly surrounds one of the second attachment elements, and said liner, said head portion, and said bottom portion are made in a single piece.

2. The cylinder as in claim 1, wherein said first attachment elements are made in a single piece with the head portion and said second attachment elements are made in a single piece with the bottom portion.

3. The cylinder as in claim 1, wherein each of said first attachment elements is aligned, in a direction substantially parallel to said longitudinal axis, to a corresponding second attachment element.

4. The cylinder as in claim 1, further comprising:
   attachment seatings made in said head and bottom portions in correspondence with and to the rear of said first and second attachment elements, each attachment seating of said head portion being configured to contain a first portion of a longitudinal tie rod, and each attachment seating of said bottom portion being configured to contain a second portion of said longitudinal tie rod.

5. The cylinder as in claim 1, further comprising:
   a circumferential coating of said liner, interposed radially between said liner and said longitudinal tie rods, made of said composite material and configured to support radial mechanical stresses acting on said liner in a direction essentially orthogonal to said longitudinal axis, and an external coating, also made of composite material, externally overlapping at least said longitudinal branches of said longitudinal tie rods.

6. A linear actuator comprising the cylinder as in claim 1, wherein said cylinder comprises a head connected to said head portion and a bottom connected to said bottom portion, and in which a piston is able to slide inside said liner along said longitudinal axis.

7. A method to produce a cylinder for an actuator, said method comprising:
   providing to prepare a liner with a tubular shape disposed along a longitudinal axis, a head portion and a bottom portion each disposed at one of the ends of said liner, wherein said liner, said head portion, and said bottom portion are made in a single piece, and to connect a plurality of longitudinal tie rods both to said head portion and to said bottom portion, externally to said liner; and
   making said longitudinal tie rods of a composite material formed by reinforcement fibers located in a matrix of binder material by winding said reinforcement fibers between said head portion and said bottom portion, wherein making said longitudinal tie rods comprises performing, for each longitudinal tie rod, one or more winding passes of filaments, fibers or strips of said composite material alternately between one of first attachment elements of said head portion and one of second attachment elements of said bottom portion, and
   said winding passes provide to make, for each longitudinal tie rod, a first portion at least partly surrounding one of said first attachment elements, a longitudinal branch parallel to said longitudinal axis, a second portion at least partly surrounding one of said second attachment elements, and a second longitudinal branch parallel to said longitudinal axis, to define said annular shape of said longitudinal tie rod.

8. The method as in claim 7, further comprising:
   after making said longitudinal tie rods, coating said liner with an external coating by overlapping said tie rods with filaments, fibers or strips of composite material, in which said overlapping provides to dispose the reinforcement fibers of said composite material according to a predominant circumferential orientation.

9. The method as in claim 7, further comprising:
before making said longitudinal tie rods, coating said liner with a circumferential coating by enveloping said liner with filaments, fibers or strips of composite material.

* * * * *